(No Model.)

S. ANDERSON.
HARROW.

No. 282,692. Patented Aug. 7, 1883.

WITNESSES:
Chas. T. Howell,
C. Sedgwick

INVENTOR:
S. Anderson
BY Munn & Co.
ATTORNEYS.

N. PETERS. Photo-Lithographer, Washington, D. C.

UNITED STATES PATENT OFFICE.

SVEN ANDERSON, OF HUMBOLDT, NEBRASKA.

HARROW.

SPECIFICATION forming part of Letters Patent No. 282,692, dated August 7, 1883.

Application filed February 14, 1883. (No model.)

*To all whom it may concern:*

Be it known that I, SVEN ANDERSON, of Humboldt, in the county of Richardson and State of Nebraska, have invented a new and Improved Harrow, of which the following is a full, clear, and exact description.

My invention consists of improved contrivances for extending and contracting an Λ-shaped harrow to widen and narrow it to suit different conditions and kinds of plants to be cultivated, all as hereinafter fully described.

Reference is to be had to the accompanying drawings, forming part of this specification, in which similar letters of reference indicate corresponding parts in all the figures.

Figure 1:
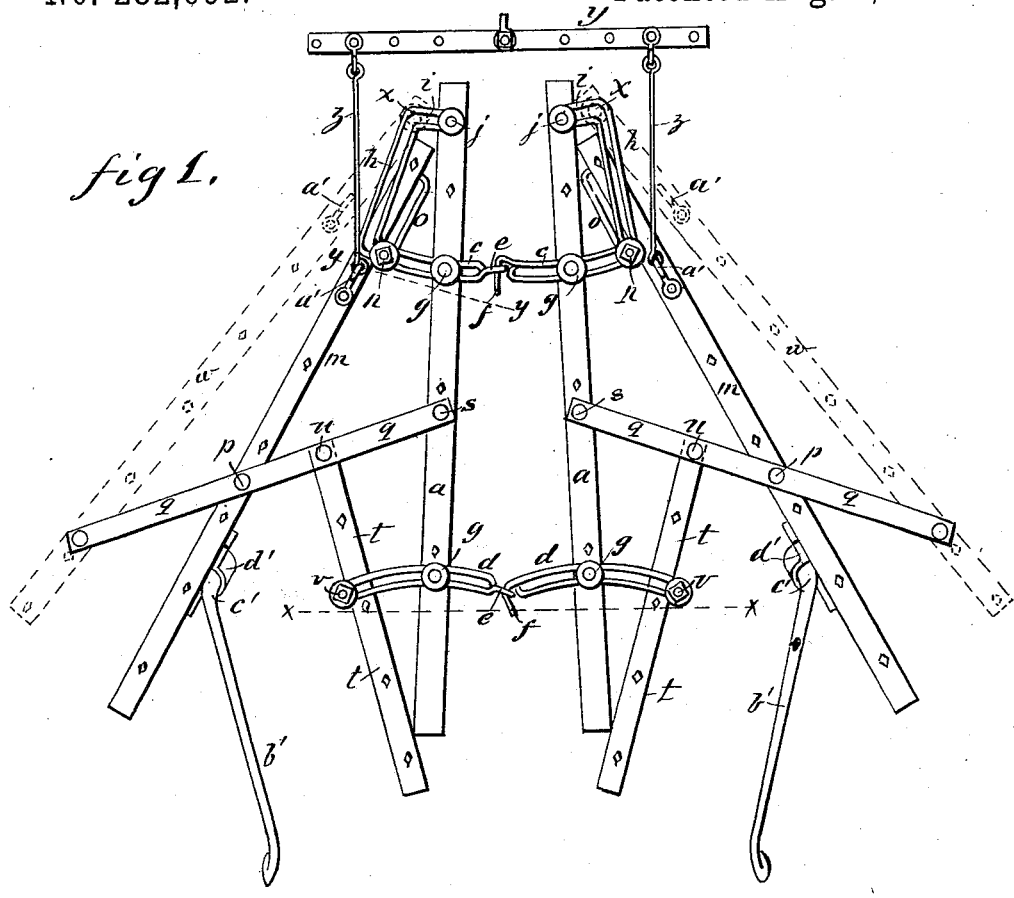
Figure 2:
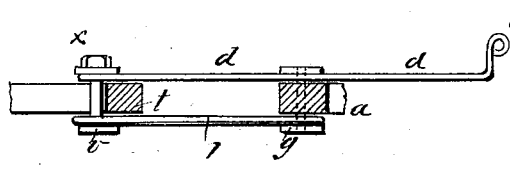
Figure 3:
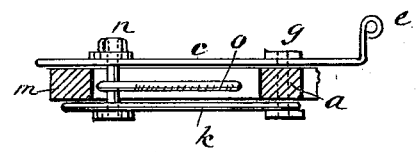
Figure 4:
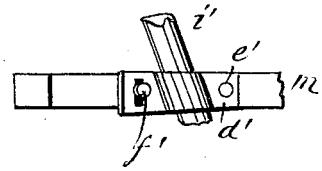

Figure 1 is a plan view of my improved harrow. Fig. 2 is a section on line $x\ x$, Fig. 1. Fig. 3 is a section on line $y\ y$. Fig. 4 is a detail in side elevation.

I connect two bars, $a$, together a short distance apart, side by side, and so as to be set parallel to each other, or nearly so, by the links $c$ and $d$, which serve for hinges, and by means of eyes $e$ and pivots $f$, formed on said links, respectively. The bars $a$ are adjustable along these links by means of clamping-bolts $g$. The links $c$, near the front ends of the bars $a$, have an elbow-extension, $a$, toward the front ends of the bars, with a return-bend, $i$, extending to and uniting with them by means of bolts $j$. These links $c$ and $d$ are placed on the upper sides of the bars $a$, and other short links, $k$, are connected to the bars under links $c$ by the bolts $g$, and similar short links, $l$, are connected to them under links $d$. Other bars, $m$, are connected to bars $a$ by links $c$ and $k$ at the front, the connection being made by bolts $n$, passing through long staples $o$ at the inside of the bars $m$, allowing said bars to slide forward and backward on the connections with links $c$ and $k$. Toward the rear ends of these bars $m$ they are pivoted at $p$ to bars $q$, which are pivoted at $s$ to bars $a$, and these bars, which extend across and beyond bars $m$, have other bars, $t$, pivoted to them at $u$, between bars $m$ and $a$, and extending backward along the harrow about as far as the back ends of the bars $a$, and being arranged between links $d$ and $l$, between which they are confined by bolts $v$, along which said bars may slide forward and backward between the links.

When desired, other bars, $w$, may be added outside of bars $m$ by pivoting them to the outer ends of bars $q$ and bolting them at the front ends, through the elbows $h$ of links $c$, by bolts $x$, allowing said ends to slide forward and back along them as the bars $q$ swing on their pivots $p$; but these bars are only to be employed when it is desired to widen the harrow to its greatest extent. The bars $q$ are employed mainly as braces to control the bars $m$ and $w$ when the harrow is extended, and are not designed for application of teeth to them; but bars $t$ are mainly employed for the purpose of toothed bars.

The hitching-bar or evener $y$ is connected by rods $z$ and hooks $a'$ with bars $m$ or $w$, according to circumstances, so that the draft tends to spread the harrow out wide, which condition it will take when the bolts $n$ and $x$ are slack. When being so used, the attendant may swing the outer bars inward by the handles $b'$ and close up the harrow into narrow compass temporarily when it may be required. By screwing up the clamp-bolts $n$ and $x$ the bars $w$ and $m$ may be secured in the more contracted positions.

The bolts $g$ and links $d$ serve to set the bars $a$ more or less aslant from each other, according as they are required to straddle the corn or to close up for working the harrow between the rows of corn, and the hitching-bars $z$ are adjustable along the evener $y$ to correspond with the breadth of the harrow.

The handles $b'$ are crooked at $c'$, and they are detachably connected to the bars $m$ by clips $d'$, enabling them to be taken out and shifted from side to side to range in proper relations to the attendant, whether the harrow be contracted or extended; and the clips $d'$ are fitted to shift up and down on the pivot $e'$, and be fastened by the bolt $f'$ to alter the pitch of the handles to suit the attendant.

Having thus described my invention, what I claim as new, and desire to secure by Letters Patent, is—

1. The bars $m$, connected to the bars $a$ by the links $c\ k$, bolts $n$, and staples $o$ at the front and by pivoted bars $q$ at the rear, substantially as described.

2. The bars $q$, pivoted to bars $a$ and $m$, and having bars $t$ connected to them, said bars $t$ being arranged to shift between the links $d$ and $l$ and along bolt $v$, substantially as described.

3. The bars $w$, connected to slotted elbow-extensions $h$ of the links $c$ by pivot and clamp bolts $x$, and pivoted to bars $q$, substantially as described.

4. In a harrow, the combination, with the bar $a$, with the pivotal bolts $j$ $g$ and the pivoted arm or bar $q$, of the bar $m$, having the staple $o$, and the link $c$, having the slotted extension $h$, substantially as and for the purpose set forth.

5. In a harrow, the bar $a$, with the pivotal bolts $j$ $g$ and the link $c$, having a slotted elbow-extension, $h$, in combination with the bar $m$, having a staple, $o$, and pivoted bars $q$ and $w$, substantially as and for the purpose set forth.

6. In a harrow, the bar $a$, with pivotal bolts $j$ $g$, and the link $c$, having a slotted elbow-extension, $h$, in combination with the bar $w$, bar $m$, having a staple, $o$, bars $q$ $t$, and links $d$ $l$, substantially as and for the purpose set forth.

SVEN ANDERSON.

Witnesses:
E. A. TUCKER,
GEO. D. MANAGAN,
ARTHUR L. MIMS.